United States Patent

Tsuchiya et al.

[11] Patent Number: 5,929,941
[45] Date of Patent: Jul. 27, 1999

[54] TELEVISION RECEIVER

[75] Inventors: Kazuhiro Tsuchiya, Kanagawa; Mariko Okamoto, Tokyo; Sumio Baba, Chiba, all of Japan

[73] Assignee: Sony Corporation, Tokyo, Japan

[21] Appl. No.: 08/497,932

[22] Filed: Jul. 5, 1995

[30] Foreign Application Priority Data

Jul. 8, 1994 [JP] Japan .................................. P06-156888

[51] Int. Cl.⁶ ..................................................... H04N 5/268
[52] U.S. Cl. ........................ 348/706; 348/552; 348/730; 348/553
[58] Field of Search .................................. 348/553–560, 348/552, 569, 725, 728, 730, 705, 706; H04N 5/44, 5/268, 5/262, 5/63

[56] References Cited

U.S. PATENT DOCUMENTS

| | | | |
|---|---|---|---|
| 4,514,764 | 4/1985 | Barg et al. | 348/552 |
| 4,581,646 | 4/1986 | Kuboderer | 348/706 |
| 4,777,503 | 10/1988 | Kramer | 348/705 |
| 4,914,516 | 4/1990 | Duffield | 348/559 |
| 5,134,486 | 7/1992 | Surzuki et al. | 348/730 |
| 5,146,331 | 9/1992 | Tsuchida | 348/556 |
| 5,204,662 | 4/1993 | Oda et al. | 348/706 |
| 5,231,511 | 7/1993 | Kodama et al. | 358/906 |
| 5,452,023 | 9/1995 | Kim | 348/559 |

FOREIGN PATENT DOCUMENTS 0143179 6/1991 Japan .................................. 348/730

*Primary Examiner*—Michael Lee
*Attorney, Agent, or Firm*—Jay H. Maioli

[57] ABSTRACT

A television receiver includes a broadcasting wave receiving section, image displaying and sound producing sections which operatively and respectively treat video and audio signals issued from the broadcasting wave receiving section, and a control section which controls the broadcasting wave receiving section, the image displaying section and the sound producing section. There are also provided a TV-game terminal for receiving video and audio signals issued from a TV-game playing device; a game mode selection switch for producing a given information signal when reception of the video and audio signals into the image displaying and sound producing sections is required; a power terminal for feeding the TV-game playing device with a direct current electric power thereby to energize the playing device; and an input mode switching circuit which, upon receiving the given information signal from the game mode selection switch, switches to a game mode in which the signals fed to the TV-game terminal are operatively input into the image displaying and sound producing sections.

33 Claims, 6 Drawing Sheets

TELEVISION RECEIVER

BACKGROUND OF THE INVENTION

1. Field of the Invention

The present invention relates in general to television receivers, and more particularly to television receivers of a type to which various auxiliary devices, such as a video tape recorder, video camera, video disc player, TV-game playing device and the like, can be operatively connected. More specifically, the present invention is concerned with a user's interface through which the TV-game playing device is operatively connected to the television receiver.

2. Description of the Prior art

In order to enjoy games on a television receiver indoors by using a TV-game playing device, video and audio signal cables of the playing device are respectively connected to video and audio signal input terminals, for example, the terminals indicated by a sign "VIDEO-2", of the television receiver, which terminals are arranged on a terminal panel of the receiver. Thereafter, an input plug of an AC/DC converter for the game playing device is connected to a domestic electric outlet and then an output plug of the converter is connected to a power input of the game playing device. Thereafter, the television receiver and the playing device are both turned ON and then the television receiver is manipulated to assume the "VIDEO-2" mode. With this, the video and audio signals output from the playing device can be displayed on the television receiver.

If, for enjoying a very dynamic game on the television receiver, making the best use of the video and audio signals from the game playing device is intended, it becomes necessary to adjust the VIDEO-2 mode of the television receiver to a specified one.

As is described hereinabove, for operatively connecting a TV-game playing device to a television receiver, complicated cable connections have been hitherto needed. For example, the connection of the AC/DC converter to the domestic electric outlet is troublesome when the electric outlet is not positioned near the television receiver. Furthermore, such cable connections requires a player (viz., a person handling the game playing device) to have a considerable knowledge of electricity.

Furthermore, if the player wants to enjoy a very dynamic game with the game playing device, he or she should adjust the VIDEO-2 mode to the above-mentioned specified one, and the player should return the mode of the television receiver to the normal VIDEO-2 mode after enjoying the game. However, these adjusting operations are very troublesome and require a long time. Thus, hitherto, actually, such adjusting has not been carried out by players, and thus, the performance of the TV-game playing device has not been fully exhibited by the television receiver.

SUMMARY OF THE INVENTION

It is therefore an object of the present invention to provide a television receiver which is free of the above-mentioned drawbacks.

According to the present invention, there is provided a television receiver to which a TV-game playing device can be connected with a simple cable connecting operation.

According to the present invention, there is further provided a television receiver which can automatically adjust its operation mode to a so-called "game mode" when a TV-game playing device is connected thereto.

According to a first aspect of the present invention, there is provided an improved combination in a television receiver including a broadcasting wave receiving section, image displaying and sound producing sections which operatively and respectively treat video and audio signals issued from the broadcasting wave receiving section, and a control section which controls the broadcasting wave receiving section, the image displaying section and the sound producing section. The improved combination comprises a TV-game terminal for receiving video and audio signals issued from a TV-game playing device; a game mode selection switch for producing a given information signal when reception of the video and audio signals into the image displaying and sound producing sections is required; a power terminal for feeding the TV-game playing device with a direct current electric power thereby to energize the playing device; and an input mode switching circuit which, upon receiving the given information signal from the game mode selection switch, switches to a game mode in which the signals fed to the TV-game terminal are operatively input into the image displaying and sound producing sections.

According to a second aspect of the present invention, there is provided an improved combination in a television receiver including a broadcasting wave receiving section, image displaying and sound producing sections which operatively and respectively treat video and audio signals issued from the broadcasting wave receiving section, and a control section which controls the broadcasting wave receiving section, the image displaying section and the sound producing section. The improved combination comprises a TV-game terminal for receiving video and audio signals issued from a TV-game playing device; a game mode selection switch for producing a given information signal when reception of the video and audio signals into the image displaying and sound producing sections is required; an input mode switching circuit which, upon receiving the given information signal from the game mode selection switch, switches to a game mode in which the signals fed to the TV-game terminal are operatively input into the image displaying and sound producing sections; and a parameter switching means which, upon receiving the given information signal from the game mode selection switch, changes values of control parameters of at least one of the image displaying section and the sound producing section to values different from values which are established when the input mode switching circuit assumes a broadcasting mode.

According to a third aspect of the present invention, there is provided an improved combination in a television receiver including a broadcasting wave receiving section, image displaying and sound producing sections which operatively and respectively treat video and audio signals issued from the broadcasting wave receiving section, and a control section which controls the broadcasting wave receiving section, the image displaying section and the sound producing section. The improved combination comprises a TV-game terminal for receiving video and audio signals issued from a TV-game playing device; a game mode selection switch for producing a given information signal when reception of the video and audio signals into the image displaying and sound producing sections is required; a power terminal for feeding the TV-game playing device with a direct current electric power thereby to energize the playing device; an input mode switching circuit which, upon receiving the given information signal from the game mode selection switch, switches to a game mode in which the signals fed to the TV-game terminal are operatively inputted into the image displaying and sound producing sections; and a parameter switching means which, upon receiving the given information signal from the game mode selection switch, changes values of control parameters of at least one of the image displaying section and the sound producing section to values different from values which are established when the input mode switching circuit assumes a broadcasting mode.

BRIEF DESCRIPTION OF THE INVENTION

Other objects and advantages of the present invention will become apparent from the following description when taken in conjunction with the accompanying drawings, in which.

DETAILED DESCRIPTION OF THE INVENTION

Figure 1:
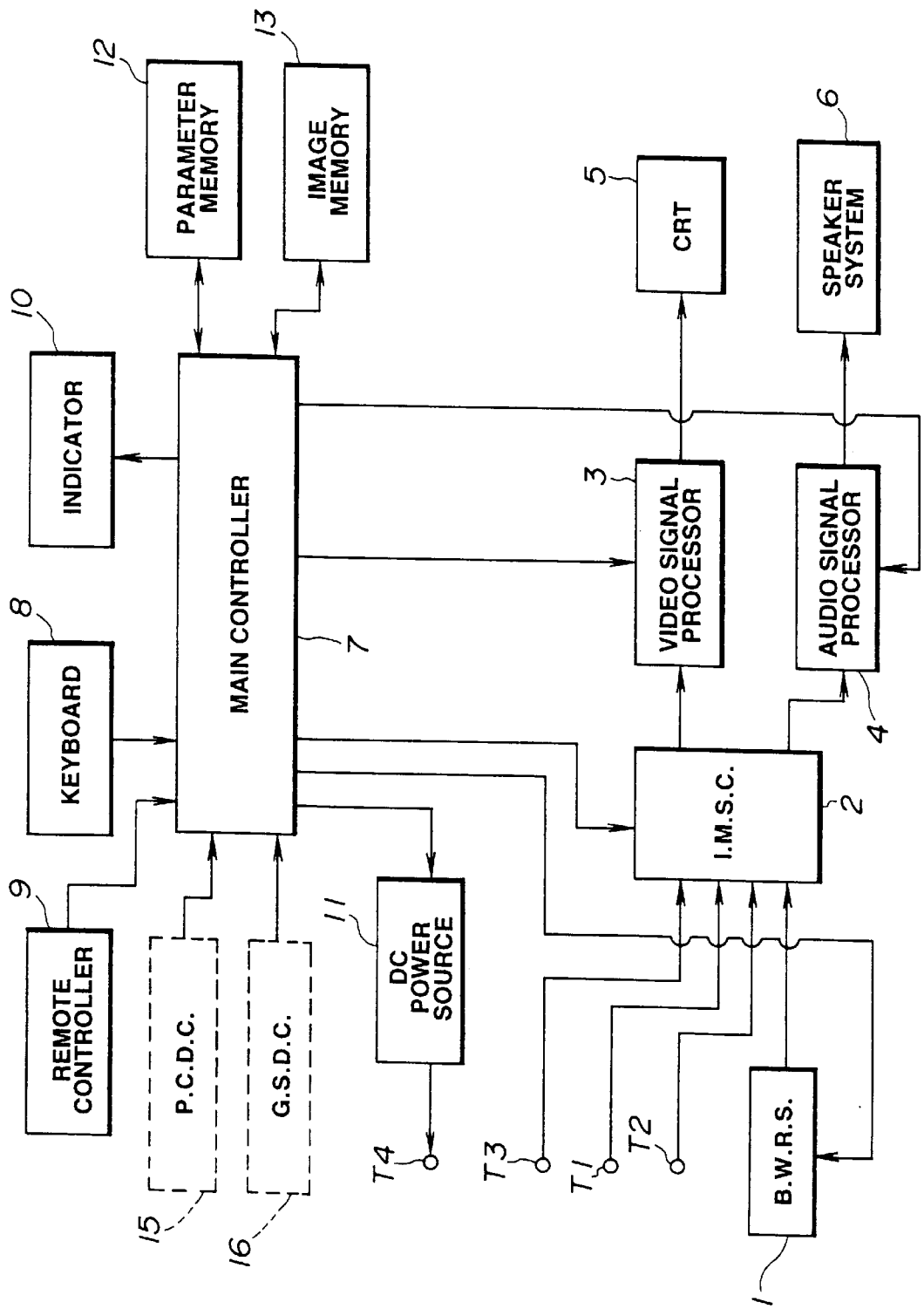
FIG. 1 is a block diagram of an electric circuit of a television receiver to which the present invention is applied.

In FIG. 1, there is shown a block diagram of an electric circuit of a television receiver to which the present invention is practically applied.

The television receiver comprises a broadcasting electric wave receiving section 1 which receives television broadcasting waves. As will be described hereinafter, when the television receiver selects a TV-mode, video and audio signals from the wave receiving section 1 are led through an input mode switching circuit 2 to a video signal processor 3 and an audio signal processor 4, so that the image and sound of the television broadcasting are displayed and produced on a CRT (cathode-ray tube) 5 and a speaker system 6 respectively. Designated by numeral 7 is a main controller of the television receiver, by which the channel switching operation at the wave receiving section 1, the mode selection at the input mode switching circuit 2, the image mode selection at the video signal processor 3 and the audio mode selection at the audio signal processor 4 are controlled. In addition to this control, various operations of the television receiver are totally controlled by the main controller 7 in a known manner. For permitting a user to reset the mode of the television receiver, there are provided a key board 8 and a remote controller 9. An indicator unit 10 is incorporated with the key board 8 to indicate various operation information of the television receiver. The main controller 7 is equipped with a parameter memory 12 and an image memory 13 which function in an after-mentioned manner.

As external input terminals of the receiver, a first input terminal T1 for VIDEO-1, a second input terminal T2 for VIDEO-2 and a third input terminal T3 for a game playing device are arranged. The third terminal T3 is separate from the other terminals, in particular the terminal T2, and is dedicated to games. As will become apparent as the description proceeds, the third input terminal T3 is an important element of the present invention. Video and audio signals from these input terminals T1, T2 and T3 are led into the input mode switching circuit 2 in parallel with the signals which are led from the wave receiving section 1 to the circuit 2. A power terminal T4 is further arranged which is connected to a direct current power source 11 installed in the television receiver. The power terminal T4 is used for powering the TV-game playing device. The power terminal T4 and the direct current power source 11 are also important elements of the invention.

The first and second input terminals T1 and T2 are arranged on a back side of the television receiver.

Figure 2:
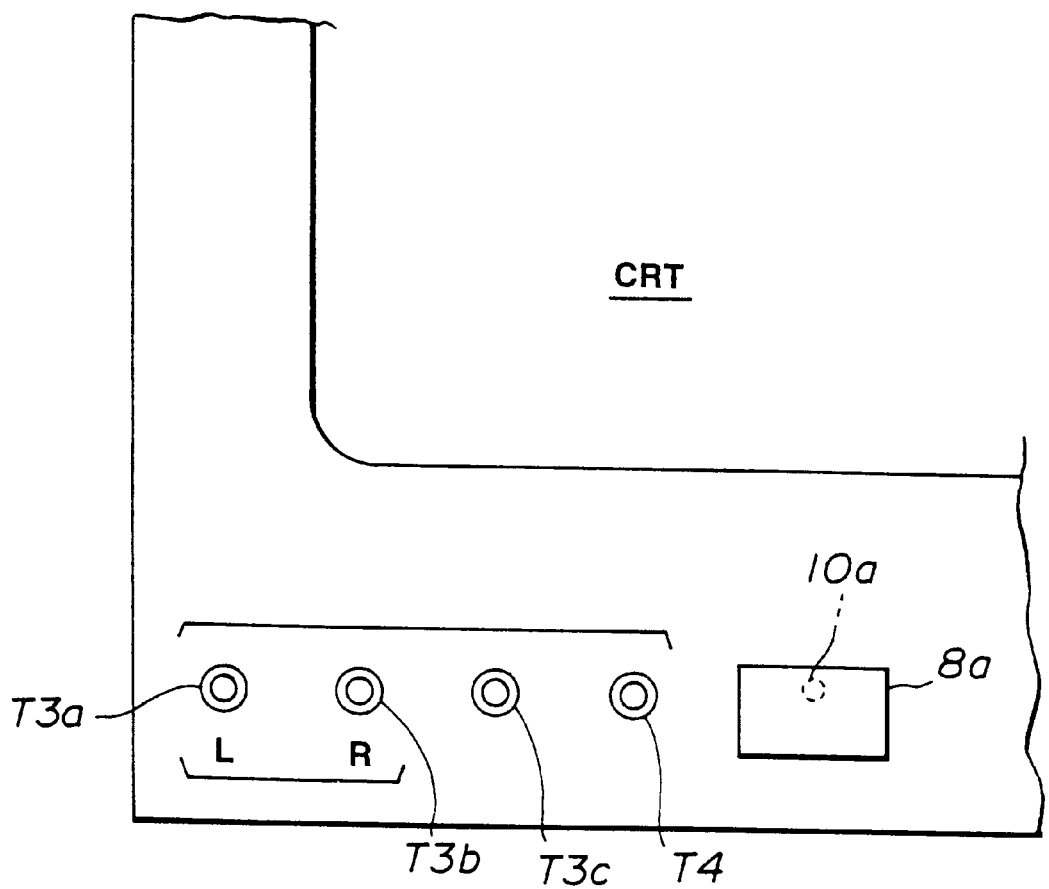
FIG. 2 is a partial front view of the television receiver, showing a portion where various input terminals for a TV-game playing device are arranged.

As is seen from FIG. 2, the third input terminal T3 and the power terminal T4 are arranged on a front side of the television receiver. It is to be noted that the third input terminal T3 includes a pair (viz., right sound and left sound) of audio signal input terminals T3a and T3b, and a video signal input terminal T3c. As shown, the power terminal T4 is positioned near the video signal input terminal T3c.

As is shown in FIG. 2, a game mode selection switch 8a is further arranged on the front side of the television receiver near the power terminal T4. It is to be noted that the game mode selection switch 8a is one of the keys possessed by the key board 8 (see FIG. 1). The switch 8a includes an indication lamp 10a which is illuminated when the switch 8a selects the game mode. If desired, the remote controller 9 may be equipped with such game mode selection switch. Although not shown in the drawings, the key board 8 and the remote controller 9 include a TV channel selection switch, a VIDEO-1 selection switch and a VIDEO-2 selection switch.

Figure 3:
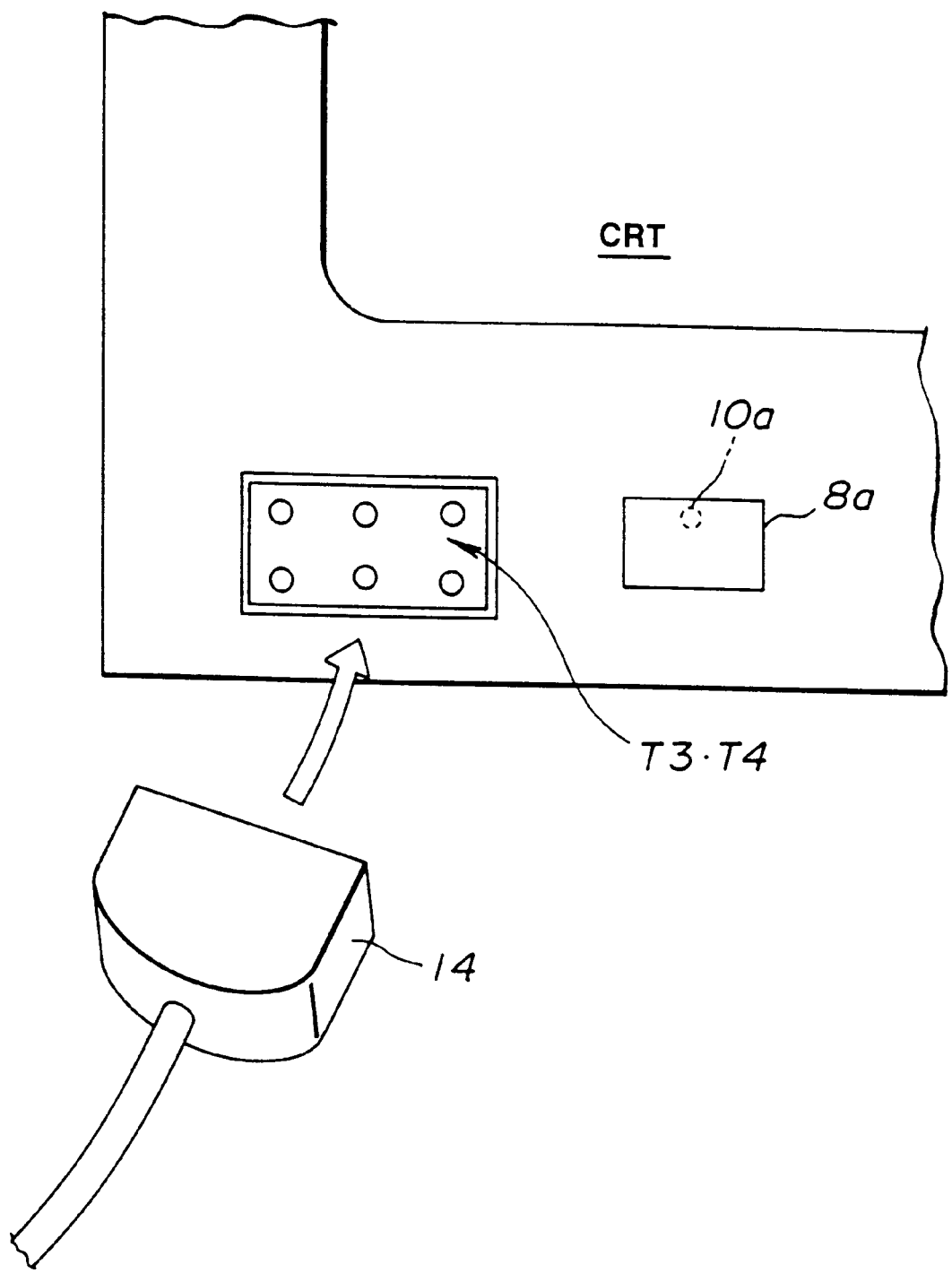
FIG. 3 is a view similar to FIG. 2, but showing a modification of the present invention.

FIG. 3 shows a modified arrangement of the third input terminal T3 and the power terminal T4. As is seen from the drawing, in this arrangement, the terminals T3 and T4 constitute an integrated input terminal unit with which a plug 14 on a cable from the game playing device is detachably connectable.

The parameter memory 12 stores various parameters which are used by the main controller 7. The parameters include parameters of image modes (viz., full mode, zoom mode, wide zoom mode and the like) related to the operation of the video signal processor 3, parameters of image quality (viz., brightness, sharpness and the like), and parameters of sound quality (viz., boosting for high-pitched tone, boosting for low-pitched tone, surround sound effect and the like) related to the operation of the audio signal processor 4.

Figure 4:
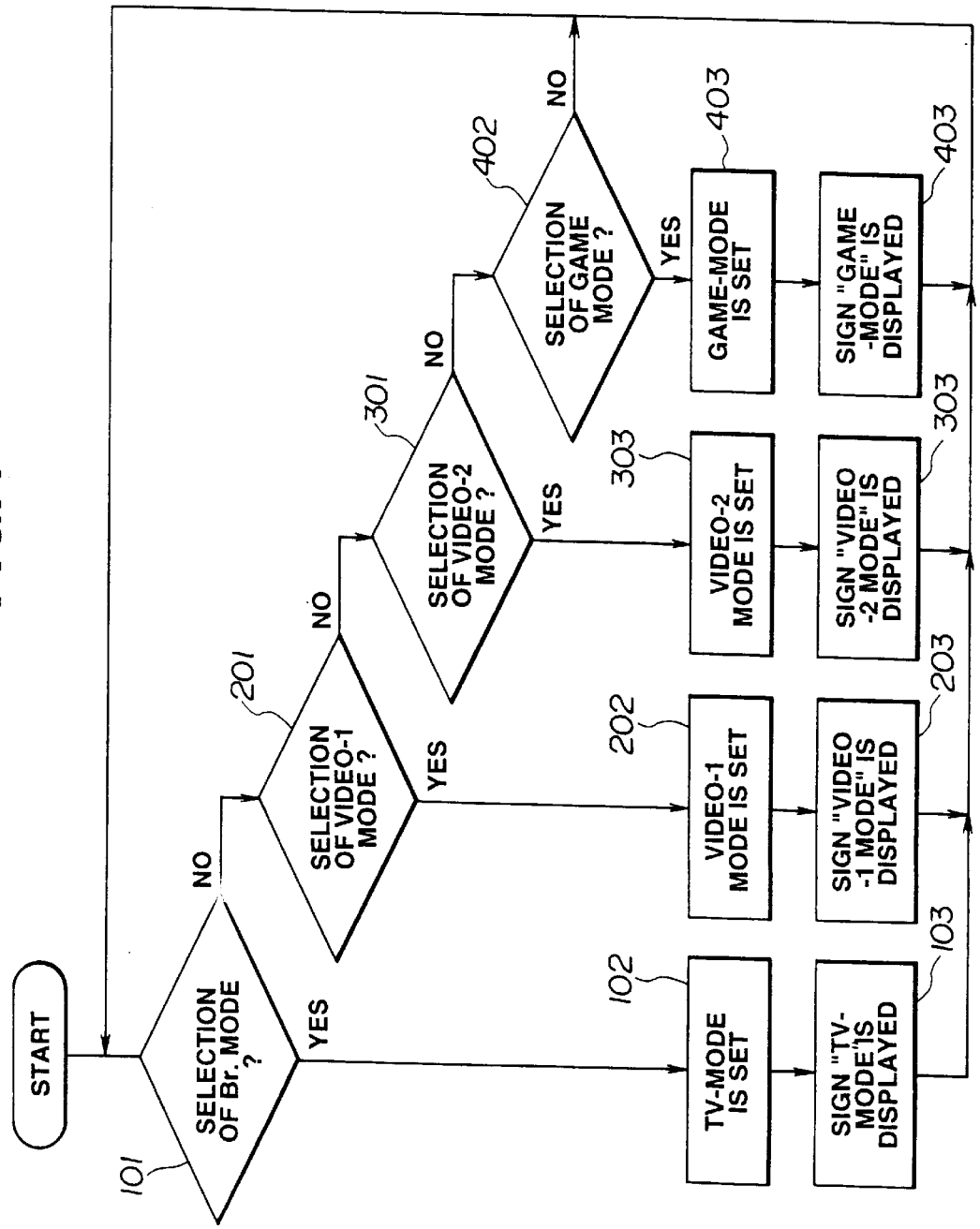
FIG. 4 is a flowchart showing programmed operation steps carried out in the television receiver of the invention for selecting a desired mode.

Referring to FIG. 4, there is shown a flowchart of programmed operation steps which are carried out by the main controller 7 for selecting a desired mode.

When the television receiver, which has been kept in a standby condition, is turned ON, the receiver is forced to assume a previously set operation mode. If, under this condition, the mode selection switches (viz., broadcasting mode selection switch, VIDEO-1 selection switch, VIDEO-2 selection switch, game mode selection switch 8a and the like) of the remote controller 9 and the key board 8 are manipulated, the operation mode of the receiver is changed to a desired mode. This will be described with reference to the flowchart of FIG. 4 and the circuit of FIG. 1.

That is, when the broadcasting mode selection switch is turned ON, the flow of the operation steps goes to step 101, step 102 and step 103, so that the input mode switching circuit 2 selects the broadcasting wave receiving section 1. With this, the above-mentioned various parameters are set to the values suitable for the TV-mode and thus the television receiver assumes the TV-mode. Upon this, the indicator unit 10 displays a sign "TV-mode" on a screen of the CRT 5.

While, when the VIDEO-1 selection switch is turned ON, the flow of the operation steps goes to step 101, step 201, step 202 and step 203, so that the input mode switching circuit 2 selects the first input terminal T1 for VIDEO-1. With this, the various parameters are set to the values suitable for the VIDEO-1 mode and thus the television receiver assumes the VIDEO-1 mode, and the indicator unit 10 displays a sign "VIDEO-1" on the screen of the CRT 5.

Similarly, when the VIDEO-2 selection switch is turned ON, the flow of the operation steps goes to step 101, step 201, step 301, step 302 and step 303, so that the input mode switching circuit 2 selects the second input terminal T2 for VIDEO-2. With this, the various parameters are set to the values suitable for the VIDEO-2 mode and thus the television receiver assumes the VIDEO-2 mode and the indicator unit 10 displays a sign "VIDEO-2" on the screen of the CRT 5.

When the game mode selection switch 8a is turned ON, the flow of the operation steps goes to step 101, step 201, step 301, step 401, step 402 and step 403, so that the input mode switching circuit 2 selects the third input terminal T3 for the game playing device. With this, the various parameters are set to the values suitable for the TV-game mode and the indicator unit 10 displays a sign "GAME" on the screen of the CRT 5. Thus, when the game playing device is operatively connected to the third input terminal T3 in an after-mentioned manner, the video and audio signals from the game playing device are led into the video and audio signal processors 3 and 4 respectively through the input mode switching circuit 2, and at the same time, the parameters for the image mode, image quality, sound quality etc., which are stored in the parameter memory 12, are set to values suitable for the TV-game mode.

If desired, the direct current power source 11 (see FIG. 1) may be so arranged as to be operative only when the television receiver assumes the TV-game mode. For this arrangement, a power switch connected to the power source is employed, which is automatically turned ON when the step 402 of the flowchart of FIG. 4 is carried out, and automatically turned OFF when the television receiver is changed to assume some other mode.

In the modified arrangement of FIG. 3, a so-called "plug connection detecting circuit" 15 (see FIG. 1) may be further employed, which functions to detect whether the plug 14 of the TV-game playing device is connected to the integrated input terminal unit (T3, T4) or not.

Figure 5:
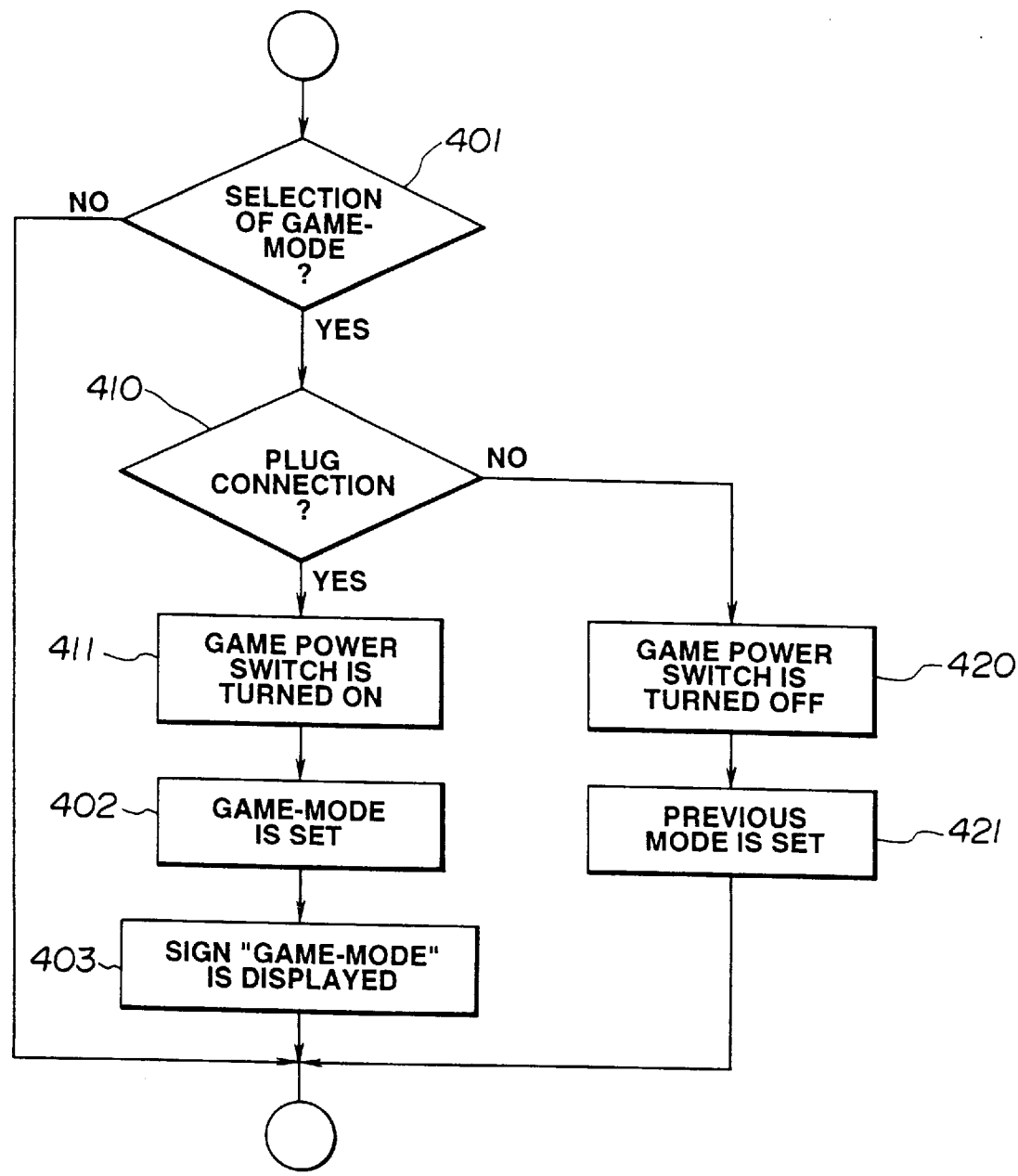
FIG. 5 is a flowchart showing the essentials of programmed operation steps carried out in a modification of the invention for selecting a desired mode.

By using an information signal issued from the plug connection detecting circuit 15, the TV-game mode can be automatically set in the television receiver in such a manner as is depicted in the flowchart of FIG. 5.

That is, after judging the-ON condition of the game mode selection switch 8a at step 401, a judgment is carried out at step 410 as to whether the plug 14 of the game playing device is connected to the input terminal unit (T3, T4) or not. If YES, that is, when the plug 14 has been connected to the terminal unit (T3, T4), the operation flow goes to step 411 to turn ON the switch of the direct current power source 11, then the operation flow goes to step 402 to change the mode of the television receiver to the TV-game mode and then, the operation flow goes to step 403 to display the sign "GAME" on the screen of the CRT 5. If NO at step 410, that is, when the plug 14 is not connected to the input terminal unit (T3, T4), the operation flow goes to step 420 to turn OFF the switch of the direct current power source 11, and then the operation flow goes to step 421 to change the mode of the television receiver to a previously set mode. When, with the television receiver assuming the TV-game mode, the plug 14 is disconnected from the terminal unit (T3, T4), the operation flow goes to step 420 and step 421 and thus the receiver changes its mode to the previously set mode.

In addition to the above, in the modified arrangement of FIG. 5, a so-called "game signal detecting circuit" 16 (see FIG. 1) may be further employed, which functions to detect whether the third input terminal T3 receives a predetermined signal from the game playing device or not.

Figure 6:
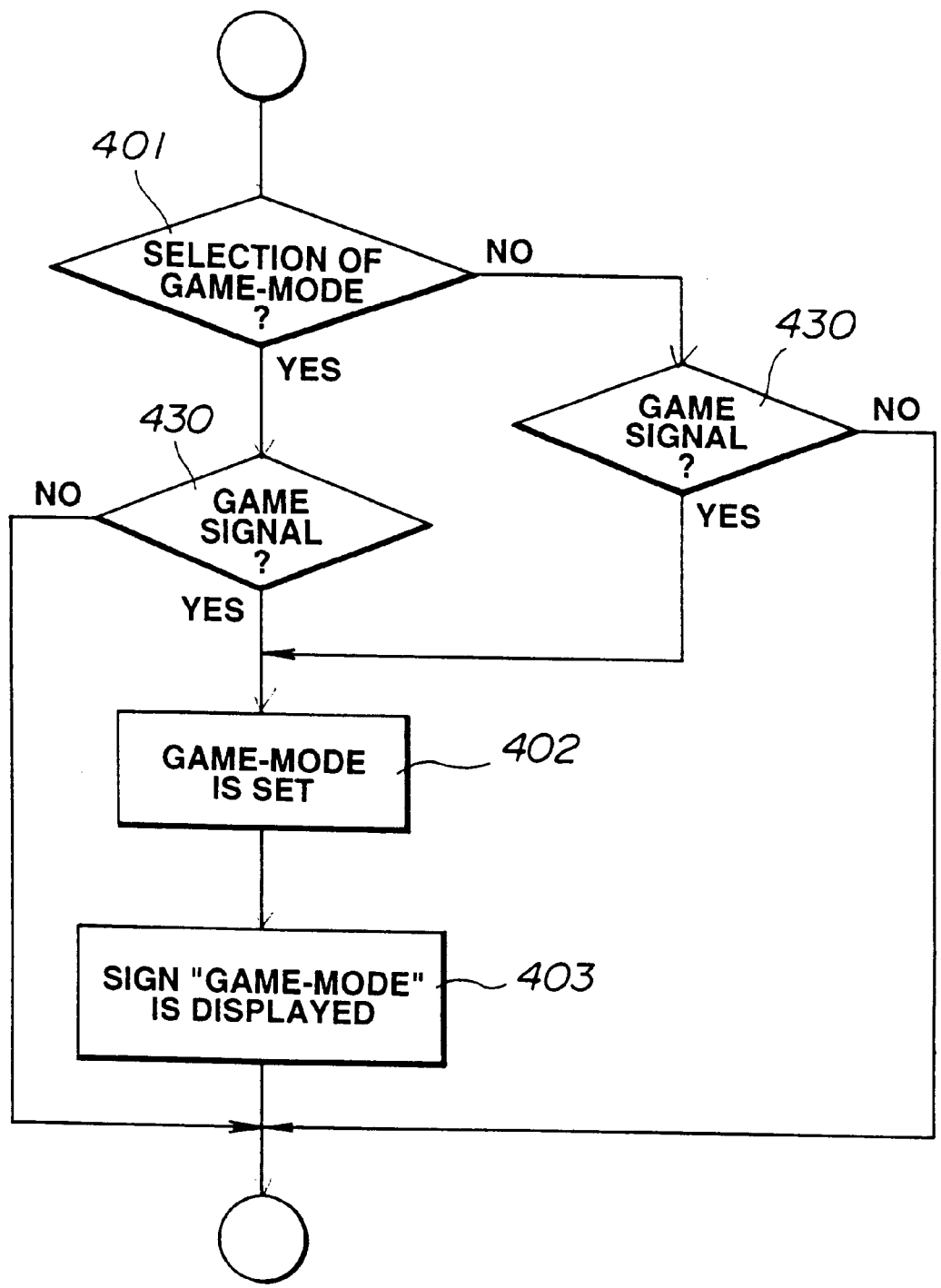
FIG. 6 is a flowchart showing the essentials of programmed operation steps carried out in a further modification of the invention for selecting a desired mode.

By using an information signal issued from the game signal detecting circuit 16, the TV-game mode can be automatically set in the television receiver in such a manner as is depicted in the flowchart of FIG. 6.

That is, after judging the OFF condition of the game mode selection switch 8a at step 401, a judgment is carried out at step 430 as to whether the third input terminal T3 receives the predetermined signal from the game playing device or not. If YES, that is, when the third input terminal T3 is receiving the signal from the game playing device, the operation flow goes to step 402 and step 403. With this, the mode of the television receiver is changed to the TV-game mode and the television receiver displays the sign "GAME" on the screen. If NO at step 430, that is, when, with the game mode selection switch 8a kept OFF, the third input terminal T3 does not receive the predetermined signal from the game playing device, the mode change of the television receiver does not take place.

When, under operation of the game mode, the keys of the key board 8 are manipulated, the values of the above-mentioned various parameters are changed or renewed. The renewed values of the parameters are stored in the parameter memory 12, with which a subsequent game mode is executed. When, under operation of the game mode, an image setting key of the key board 8 is turned ON, the existing image is memorized in the image memory 13. When, thereafter, an image calling key of the key board 8 is turned ON, the image reappears on the screen of the CRT 5.

If desired, the input mode switching circuit 2 may have only three input terminals. That is, the third input terminal T3 for the game playing device and the second input terminal T2 for the VIDEO-2 may be combined to constitute a common input terminal. In this case, the mode switching operation of the circuit 2 is equally applied to such two input modes. Thus, the values of the above-mentioned parameters should be changed each time the two input modes change.

What is claimed is:

1. In a television receiver including a broadcasting wave receiving section, image displaying and sound producing sections which respectively treat video and audio signals issued from said broadcasting wave receiving section, and a control section which controls said broadcasting wave receiving section, said image displaying section and said sound producing section, the improvement comprising:

a dedicated TV-game terminal for receiving video and audio signals issued from a TV-game playing device;

a game mode selection switch for producing a predetermined information signal when reception of said video and audio signals of said TV-game playing device into said image displaying and sound producing sections is required;

means responsive to said predetermined information signal for supplying said TV-game playing device with direct current electric power thereby to energize the TV-game playing device; and an input mode switching circuit responsive to said predetermined information signal for switching to a game mode in which said audio and video signals from said TV-game playing device fed to said TV-game terminal are input to said image displaying and sound producing sections.

2. A television receiver as claimed in claim 1, in which said TV-game terminal and said game mode selection switch are arranged on a front side of the television receiver.

3. A television receiver as claimed in claim 1, further comprising an indicator which produces a given indication when said input mode switching circuit switches to said game mode.

4. A television receiver as claimed in claim 3, in which said indicator is incorporated with said game mode selection switch.

5. A television receiver as claimed in claim 1, in which said TV-game terminal and said direct current supplying means are integrally arranged on a front side of the television receiver.

6. A television receiver as claimed in claim 1, further comprising a game signal detecting circuit which issues to said control section a game information signal when said TV-game terminal receives a signal from said TV-game playing device, said input mode switching circuit switching to said game mode when said game signal detecting circuit issues said game information signal irrespective of operation of said game mode selection switch.

7. A television receiver as claimed in claim 1, further comprising a plug connection detection circuit which issues a plug information signal when a plug of said TV-game playing device is operatively connected to said TV-game terminal, said input mode switching circuit switching to said game mode and said direct current supplying means becoming operative when said plug connecting detecting circuit issues said plug information signal.

8. A television receiver as claimed in claim 1, further comprising a power ON/OFF control means which selectively establishes and breaks an electric connection between a direct current power source and said direct current supplying means in accordance with an operation of said game mode selection switch.

9. A television receiver as claimed in claim 8, further comprising a plug connection detecting circuit which issues to said control section a plug information signal when a plug of said TV-game playing device is operatively connected to both said TV-game terminal and said direct current supplying means, said power ON/OFF control means establishing the electric connection between said direct current power source and said direct current supplying means when said plug connection detecting circuit issues said plug information signal.

10. A television receiver as claimed in claim 1, further comprising an image memory which, upon receiving a first command signal under the game mode operation, memorizes an existing image of said image displaying section, said image memory permitting said image displaying section to display the memorized image upon receiving a second command signal.

11. In a television receiver including a broadcasting wave receiving section, image displaying and sound producing sections which respectively operate on video and audio signals issued from said broadcasting wave receiving section, and a control section which controls said broadcasting wave receiving section, said image displaying section and said sound producing section, the improvement comprising:

a dedicated TV-game terminal for receiving video and audio signals issued from a TV-game playing device;

a game mode selection switch for producing a predetermined information signal when reception of said video and audio signals of said TV-game playing device into said image displaying and sound producing sections is required;

an input mode switching circuit responsive to said predetermined information signal for switching to a game mode in which said audio and video signals fed from said TV-game playing device to said TV-game terminal are input to said image displaying and sound producing sections; and parameter switching means responsive to said predetermined information signal for changing values of control parameters of at least one of said image displaying section and said sound producing section to values different from values which are established when said input mode switching circuit assumes a broadcasting wave receiving mode; and further comprising:

a power terminal for feeding said TV-game playing device with direct current electric power from a direct current power source thereby to energize the TV-game playing device;

a plug connection detecting circuit which issues to said control section a plug information signal when plugs of said TV-game playing device are respectively connected to both said TV-game terminal and said power terminal; and power ON/OFF control means which selectively establishes and breaks an electric connection between said direct current power source and said power terminal in accordance with the operation of said game mode selection switch, wherein said ON/OFF control means establishes the electric connection between said direct current power source and said power terminal when said plug connection detecting circuit issues said plug information signal.

12. A television receiver as claimed in claim 11, in which said TV-game terminal and said game mode selection switch are arranged at a front side of said television receiver.

13. A television receiver as claimed in claim 11, further comprising an indicator which produces a game indication signal when said input mode switching circuit switches to said game mode.

14. A television receiver as claimed in claim 13, in which said indicator is incorporated with said game mode selection switch.

15. A television receiver as claimed in claim 11, further comprising a game signal detecting circuit which issues to said control section a game information signal when said TV-game terminal receives a predetermined signal from said TV-game playing device, said input mode switching circuit and said parameter switching means switching to said game mode respectively when said game signal detecting circuit issues said game information signal irrespective of operation of said game mode selection switch.

16. A television receiver as claimed in claim 11, wherein when said plug connection detecting circuit issues to said control section said plug information signal when a plug of said TV-game playing device is operatively connected to said TV-game terminal, said input mode switching circuit and said parameter switching means switch to said game mode respectively when said plug connection detecting circuit issues said plug information signal irrespective of operation of said game mode selection switch.

17. A television receiver as claimed in 11, in which said TV-game terminal forms an auxiliary input terminal into which video and audio signals from an external video device are fed, and in which a video device selection switch is employed in addition to said game mode selection switch, wherein said input mode switching circuit switches, upon receiving said video and audio signals from said external video device, to the game mode thereby to feed said image displaying section and said sound producing section with the video and audio signals from said external video device, and wherein said parameter switching means changes the values of the control parameters in response to an information signal issued from said video equipment selection switch upon receiving said predetermined information signal from said game mode selection switch.

18. A television receiver as claimed in claim 11, in which said control parameters include at least a part or all of parameters of image modes, parameters of image quality, and parameters of sound quality.

19. A television receiver as claimed in claim 11, further comprising a parameter memory means which, when the values of said control parameters are changed under a game mode operation, memorizes the changed control parameters as the parameters for a subsequent game mode.

20. In a television receiver including a broadcasting wave receiving section, image displaying and sound producing sections which respectively operate on video and audio signals issued from said broadcasting wave receiving section, and a control section which controls said broadcasting wave receiving section, said image displaying section and said sound producing section, the improvement comprising:

a dedicated TV-game terminal for receiving video and audio signals issued from a TV-game playing device;

a game mode selection switch for producing a predetermined information signal when reception of said video and audio signals of said TV-game playing device into said image displaying and sound producing sections is required;

an input mode switching circuit responsive to said predetermined information signal for switching to a game mode in which said audio and video signals fed from said TV-game playing device to said TV-game terminal are input to said image displaying and sound producing sections;

parameter switching means responsive to said predetermined information signal for changing values of control parameters of at least one of said image displaying section and said sound producing section to values different from values which are established when said input mode switching circuit assumes a broadcasting wave receiving mode; and an image memory displaying means for displaying a memorized image, said image memory displaying means memorizing an existing image when, under a game mode operation, a first command is received, and displaying the memorized image when receiving a second command.

21. In a television receiver including a broadcasting wave receiving section, image displaying and sound producing sections which respectively operate on video and audio signals issued from said broadcasting wave receiving section, and a control section which controls said broadcasting wave receiving section, said image displaying section and said sound producing section, the improvement comprising:

a dedicated TV-game terminal for receiving video and audio signals issued from a TV-game playing device;

a game mode selection switch for producing a predetermined information signal when reception of said video and audio signals of said TV-game playing device into said image displaying and sound producing sections is required;

means responsive to said predetermined information signal for feeding said TV-game playing device with direct current electric power thereby to energize the TV-game playing device;

an input mode switching circuit responsive to said predetermined information signal for switching from a broadcasting mode to a game mode in which the video and audio signals fed to said TV-game terminal are input to said image displaying and sound producing sections; and parameter switching means responsive to said predetermined information signal for changing values of control parameters of at least one of said image displaying section and said sound producing section to values different from values established when said input mode switching circuit is in said broadcasting mode.

22. A television receiver as claimed in claim 21, in which said TV-game terminal and said game mode selection switch are arranged at a front side of said television receiver.

23. A television receiver as claimed in claim 21, further comprising an indicator for producing a game mode indication when said input mode switching circuit switches to said game mode.

24. A television receiver as claimed in claim 22, in which said indicator is incorporated with said game mode selection switch.

25. A television receiver as claimed in claim 21, in which said TV-game terminal and said direct current feeding means are integrally arranged on a front side of the television receiver.

26. A television receiver as claimed in claim 21, further comprising a game signal detecting circuit which issues to said control section a game information signal when said TV-game terminal receives a predetermined signal from said TV-game playing device, said input mode switching circuit and said parameter switching means switching to said game mode respectively when said game signal detecting circuit issues said game information signal irrespective of operation of said game mode selection switch.

27. A television receiver as claimed in claim 21, further comprising a plug connecting detecting circuit which issues to said control section a plug information signal when a plug of said TV-game playing device is operatively connected to said TV-game terminal, said input mode switching circuit and said parameter switching means switching to said game mode respectively when said plug connection detecting circuit issues said plug information signal irrespective of operation of said game mode selection switch.

28. A television receiver as claimed in claim 21, further comprising power ON/OFF control means.

29. A television receiver as claimed in claim 28, further comprising a plug connection detecting circuit which issues to said control section a plug information signal when a plug of said TV-game playing device is connected to both said TV-game terminal and said power terminal, wherein said power ON/OFF control means establishes an electric connection when said plug connection detecting circuit issues said plug information signal.

30. A television circuit as claimed in claim 21, in which said TV-game terminal forms an auxiliary input terminal into which video and audio signals from an external video device are fed, and in which a video equipment selection switch is employed in addition to said game mode selection switch, wherein said input mode switching circuit switches, upon receiving said video and audio signals from said external video device, to the same mode thereby to feed said image displaying section and said sound producing section with the video and audio signals from said external video device, and wherein said parameter switching means changes the values of the control parameters in response to an information signal from said video equipment selection switch upon receiving said predetermined information signal from said game mode selection switch.

31. A television receiver as claimed in claim 21, in which said control parameters include at least a part or all of parameters of image modes, parameters of image quality, and parameters of sound quality.

32. A television receiver as claimed in claim 21, further comprising a parameter memory means which, when the values of said control parameters are changed under a game mode operation, memorizes the changed control parameters as the parameters for a subsequent game mode.

33. A television receiver as claimed in claim 21, further comprising an image memory displaying means for displaying a memorized image, said image memory displaying means memorizing an existing image when, under a game mode operation, a first command is received, and displaying the memorized image when a second command is received.

\* \* \* \* \*